US 8,044,338 B2

(12) United States Patent
Vial et al.

(10) Patent No.: US 8,044,338 B2
(45) Date of Patent: Oct. 25, 2011

(54) ELECTRONIC DEVICE FOR COUNTING AND STORING THE NUMBER OF ROTATIONS OF AN OBJECT AND THE NUMBER OF COUNTER RESETS

(75) Inventors: Franck Vial, Paladru (FR); Marc Beranger, Saint Martin D'Uriage (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 12/162,574

(22) PCT Filed: Jan. 29, 2007

(86) PCT No.: PCT/FR2007/000165
§ 371 (c)(1),
(2), (4) Date: Jul. 29, 2008

(87) PCT Pub. No.: WO2007/088266
PCT Pub. Date: Aug. 9, 2007

(65) Prior Publication Data
US 2009/0003510 A1    Jan. 1, 2009

(30) Foreign Application Priority Data
Jan. 31, 2006   (FR) ..................................... 06 00879

(51) Int. Cl.
*G01D 5/34*      (2006.01)
*G08B 23/00*     (2006.01)
*G01M 17/02*     (2006.01)

(52) U.S. Cl. .................. 250/231.13; 340/870.02; 73/146

(58) Field of Classification Search .......................... 250/231.13–231.18; 340/870.02; 73/146
See application file for complete search history.

(56) References Cited

U.S. PATENT DOCUMENTS

| 3,353,487 A |   | 11/1967 | Perryman |
| 4,213,119 A | * | 7/1980  | Ward et al. ............... 340/870.02 |
| 4,542,469 A | * | 9/1985  | Brandyberry et al. .......... 702/62 |
| 4,559,637 A |   | 12/1985 | Weber |
| 5,451,959 A |   | 9/1995  | Schuermann |
| 5,562,787 A |   | 10/1996 | Koch et al. |
| 6,438,193 B1 |  | 8/2002  | Ko et al. |
| 6,543,279 B1 |  | 4/2003  | Yones et al. |
| 6,591,668 B1 |  | 7/2003  | Becherer et al. |

(Continued)

FOREIGN PATENT DOCUMENTS
DE       196 20 582 A1    11/1997

(Continued)

OTHER PUBLICATIONS
International Search Report, Aug. 6, 2007.

(Continued)

*Primary Examiner* — Thanh X Luu
(74) *Attorney, Agent, or Firm* — Brinks Hofer Gilson & Lione

(57) ABSTRACT

A device for counting the number of rotations of an object in a system, in which a storage means carries counting data designed to represent the number of rotations counted. The counting data is used for conditionally resetting the storage means if and only if two separate conditions are fulfilled, where at least of one of the conditions is the reception of information from an external device, thereby insuring that the counting data represents the number of rotations counted from a predetermined time.

12 Claims, 4 Drawing Sheets

U.S. PATENT DOCUMENTS

| | | | |
|---|---|---|---|
| 6,813,526 B1 * | 11/2004 | Dodd, Jr. .................. 700/65 |
| 7,360,411 B2 | 4/2008 | Beranger et al. |
| 7,617,722 B2 | 11/2009 | Beranger et al. |
| 2002/0099517 A1 | 7/2002 | Brendon et al. |
| 2006/0152212 A1 | 7/2006 | Beranger et al. |

FOREIGN PATENT DOCUMENTS

| | | |
|---|---|---|
| DE | 101 17920 A1 | 10/2002 |
| FR | 2 678 729 | 1/1993 |
| FR | 2 856 145 | 12/2004 |
| WO | WO 96/06747 | 3/1996 |
| WO | WO 2004/110793 A3 | 12/2004 |

OTHER PUBLICATIONS

PCT Request in French.

PCT Written Opinion in French, Aug. 6, 2007.

* cited by examiner

ELECTRONIC DEVICE FOR COUNTING AND STORING THE NUMBER OF ROTATIONS OF AN OBJECT AND THE NUMBER OF COUNTER RESETS

RELATED APPLICATION

Related subject matter is disclosed in co-pending, commonly-assigned patent application having application Ser. No. 11/994,242, filed Jan. 25, 2008 and titled "DEVICE FOR COUNTING THE ROTATIONS OF AN OBJECT IN A REFERENTIAL, AND METHOD FOR CONTROLLING ONE SUCH DEVICE."

PRIORITY CLAIM

This application is a U.S. nationalization of PCT application no. PCT/2007/000165, filed Jan. 29, 2007, and claims priority to French patent application no. 06/00879, filed Jan. 31, 2006.

TECHNICAL FIELD

The invention concerns an electronic device for counting the number of rotations of an object with storage means.

BACKGROUND

Electronic devices are now being used more and more frequently to monitor mechanical systems, for example to track the operation thereof.

In this line of thinking, devices are used to count the rotations of an object mobile about an axis, for example, such as a wheel of a vehicle, for example to track wear of the tire on that wheel.

A solution of this kind is described in PCT published patent application no. WO 2004/110793, for example.

In such electronic devices, the number of rotations of the object is stored in the form of counting information, for example in a memory of the device.

However practical it may be, the monitoring function of this solution (in particular. correct tracking of the mechanical system) is based on the accuracy of the stored counting information and is therefore vulnerable if there is any risk of that information becoming corrupted, for example by a fraudster attempting to reduce (or even to reset) the number of turns stored by the device.

French patent application no. FR 2 678 729 discloses an odometer for automobile vehicles with means for conditionally resetting it. In this document, the conditions for resetting are defined inside the device, and are therefore fixed, which rules out all flexibility of use.

SUMMARY

To address the problem of the accuracy of the counting information with a solution that is both flexible and robust, the invention proposes an electronic device for counting the number of rotations of an object in a frame of reference, wherein storage means hold counting information intended to represent the number of rotations counted at any time, characterized by means for conditional resetting of the storage means adapted to reset the storage means if and only if at least two separate conditions are satisfied, at least one of the conditions being the reception of information from an external device.

This provides means for ensuring (under normal circumstances) the absence of resetting of the storage means from a predetermined time, and thus means for ensuring that the counting information is indeed representative of the number of rotations counted since that predetermined time, since resetting necessitates two separate conditions to be satisfied simultaneously. The system is nevertheless also flexible thanks to the use of an externally sourced condition.

The counting information can therefore be used to track the number of rotations from the predetermined time with greater certainty.

For example, this avoids using the counting information for tracking the number of rotations since the predetermined time following untimely resetting of the storage means (whether intentional or not).

Here "resetting" is to be understood in the general sense, namely any modification of the stored information to an earlier value, even if that value is not zero.

If the device comprises means for receiving a request to send data, a first of said conditions can consist in reception of said request, for example from the external device.

If the device comprises a microcircuit, a second of said conditions can consists in the application of a predetermined voltage to one pin of the microcircuit.

In a second embodiment, where applicable combinable with the first, absence of resetting since the predetermined time is also ensured thanks to means for counting the number of times the storage means have been reset.

Thus a number of untimely resets is available, only one reset generally being authorized during the service life of the device.

The counting means are adapted to store the number of times the storage means have been reset in a non-volatile memory, for example, so that this number is saved even in the event of interruption of the power supply to the device.

If the device comprises means for sending data, those sending means are adapted to send information relating to the number of times the storage means have been reset, which enables tracking of that information from the outside.

The device can also comprise device initialization means adapted to reset the storage means at said predetermined time, in accordance with a normal and authorized operating procedure.

In this case, the initialization means are adapted to store a predetermined code in a first portion of a random access memory, for example, a second portion of which random access memory can then form the storage means.

In a third embodiment, where applicable compatible with at least one of the first two embodiments, absence of resetting is ensured by means for verifying the presence of the predetermined code in the first portion of random access memory.

Thus untimely resetting of the storage means can be detected.

Means for sending counting information are then adapted to send that information only in the event of positive verification by the verification means, for example, so that this information is sent only if the verification means assure its reliability.

Means can additionally be provided for receiving the predetermined code after sending by an external device. The code can therefore also be stored in the external device during normal operation and transmitted to the counting device at the time of verification for comparison with the code stored in the first portion of random access memory.

BRIEF DESCRIPTION OF THE DRAWING

Other features of the invention will become more apparent in the light of the following description, given with reference to the appended drawings, in which.

DETAILED DESCRIPTION

Figure 1:
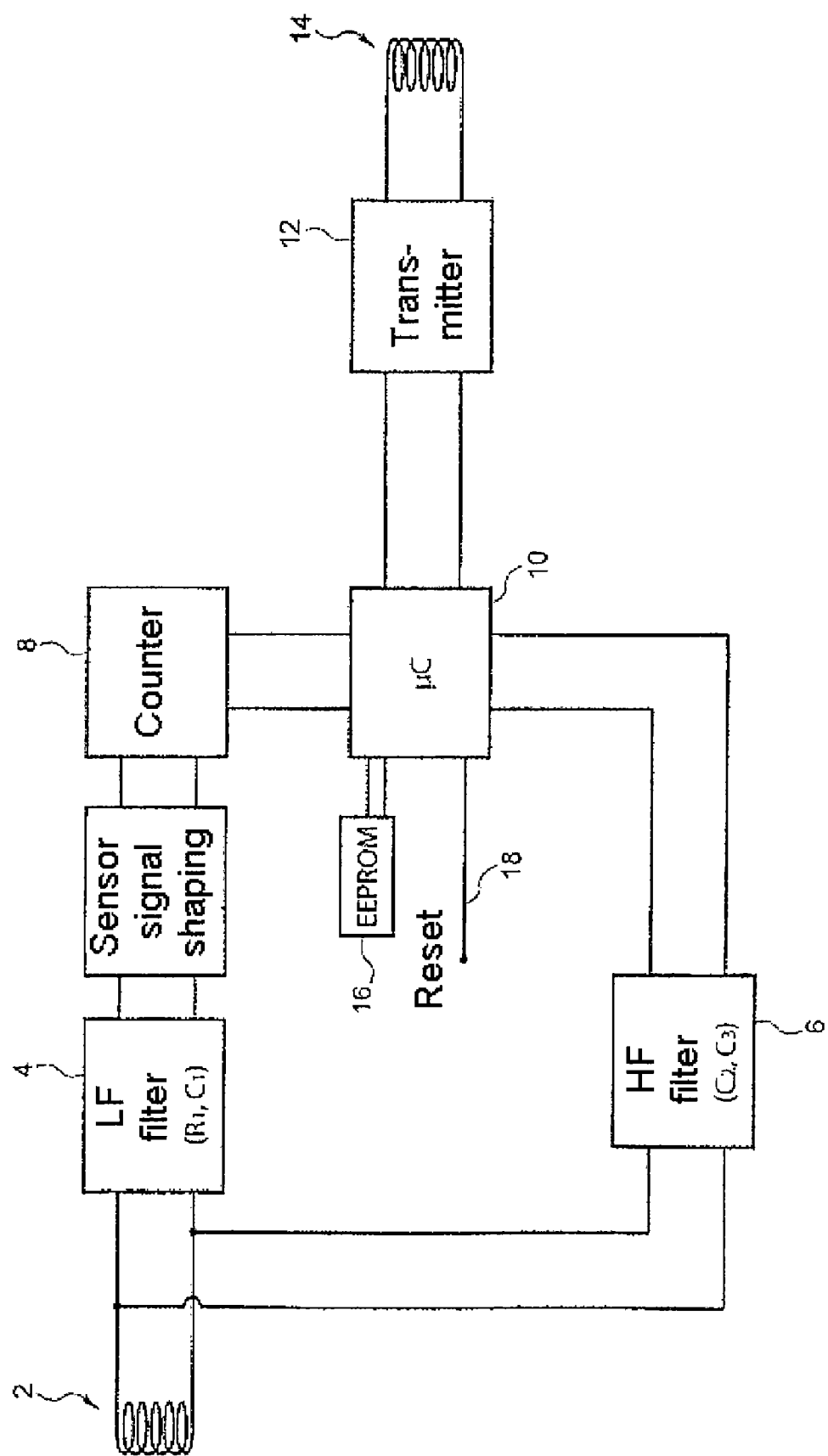
FIG. 1 illustrates a general block diagram of a counting device according to an aspect of the invention.

FIG. 1 represents the essential components of a device conforming to the teachings of the invention for counting rotations of an object in a frame of reference.

The device is an autonomous device, for example, mounted in a tire with the aim of counting the number of rotations of the tire in order to have an indication as to its state of wear.

The counting device represented in FIG. 1 comprises a magnetic sensor 2 consisting in practice of a coil, i.e. a conductive winding formed of one or more turns.

The signal generated by the sensor 2 is transmitted on the one hand to a counter 8 via a low-frequency filter 4 (referred to hereinafter as the LF filter) and then where appropriate a signal shaping circuit, and on the other hand to reception terminals of a microcontroller 10 via a high-frequency filter 6 as described in detail hereinafter.

The LF filter 4 is designed to transmit from the magnetic sensor 2 to the counter 8 only signals representative of the movement to be measured (in particular, the signals generated here at the rotation frequency of the object by the rotation of the magnetic sensor 2 in the terrestrial magnetic field).

To this end, the LF filter 4 has a high impedance outside the range of frequencies that corresponds to the measurement signals.

For example, in the situation referred to here of measuring rotations of a tire, given the ordinary rotation speeds of vehicle wheels, the signals generated by rotation in the terrestrial magnetic field have frequencies varying between 1 Hz and a few tens of Hz.

The LF filter 4 therefore has, in this case, a high impedance at frequencies above 100 Hz, for example from 1 kHz.

The function of the counter 8 is to count the number of cycles in the signal generated by the magnetic sensor 2 because of its rotation in the 35 terrestrial magnetic field, and in particular in the signal transmitted by the LF filter 4.

The counter 8 counts a predetermined number of cycles (for example 4096 cycles) in the signal that it receives from the LF filter 4, for example, transmits an overshoot indication to the microcontroller 10 if the predetermined number is reached, and then resumes counting the predefined number of cycles.

The microcontroller 10 increments an internal register each time that the overshoot information is received and therefore stores the cumulative number of overshoot indications received, which thus represents (apart from a multiplication factor) the number of cycles in the signal from the LF filter 4.

There is therefore easy access to the number of rotations of the counting device (and likewise the magnetic sensor 2 that is fastened to it) in the terrestrial magnetic field.

On this subject reference is made to published PCT patent application no. WO 2004/110793, which also describes some of the aspects that have just been referred to.

As already indicated, the coil 2 is also connected to a high-frequency filter 6 (referred to hereinafter as the HF filter). This HF filter 6 is designed to have a high impedance in the frequency domains of the signals used for the measurement (here for counting rotations), and in particular, the signals transmitted from the coil 2 to the counter 8 via the LF filter 4, so that the HF filter 6 transmits from the coil 2 to the reception terminals of the microcontroller 10 only signals with a frequency higher than a given frequency (for example of the order of 1 kHz), or in a band of frequencies the upper limit whereof corresponds to that given frequency.

The LF filter 4 and the HF filter 6 therefore have separate pass bands (for example either side of 1 kHz), so that only signals in a first frequency band are sent from the coil 2 to the counter 8 and only signals in a second frequency band are sent from the coil 2 to the reception terminals of the microcontroller 10.

In the second frequency band (here situated above 1 kHz, for example around 50 kHz with a pass band of a few kHz, for example 5 kHz, which corresponds to a Q of 10), the coil 2 behaves like an electromagnetic antenna.

This enables reception of a radio-frequency signal, from the coil 2 and via the HF filter 6, by the reception terminals of the microcontroller 10.

Information can therefore be transmitted to the counting device (in particular in practice to its microcontroller 10) by telecommunication means employing electromagnetic waves (for example on a 50 kHz carrier in the example referred to here).

This information is in particular re-activation information transmitted by an external device (typically a device of the electronic system of the vehicle or other device for surveillance of the state of wear of the tires); this re-activation information indicates to the counting device (in practice to its microcontroller 10) that the latter must send information representative of the cumulative measured movement (in particular, the number of rotations effected) as described hereinafter.

To this end, the FIG. 1 counting device also comprises a transmitter 12 electrically connected to the microcontroller 10 and a transmit antenna 14, also taking the form of a conductive winding, for example.

Thus, if it receives re-activation information by means of the coil 2 serving as a receive electromagnetic antenna, but possibly also in other phases of its operation, the microcontroller 10 sends the sender 12 information to be transmitted (such as the cumulative number of overshoot indications received, which as already indicated is representative of the number of rotations effected by the tire).

The sender 12 then transforms this information (for example received by it in the form of a bit stream) into electrical signals to be transmitted in the form of an electromagnetic wave via the transmit antenna 14, for example on a carrier at a transmission frequency (which has the value 433.92 MHz in the embodiment described here).

To summarize, the microcontroller 10 receives measurement information generated by the coil 2 at the frequencies at which the latter behaves as a magnetic sensor (measurement information processed by the counter 8) and reception information received by the coil 2 at frequencies at which it behaves as an electromagnetic antenna.

Using the LF filter 4 and the HF filter 6 limits the signals transmitted to the counter and to the reception terminals of the microcontroller 10 exclusively to the respective frequency ranges useful in each case, in particular, the frequencies at which the measurement information or signals appear (generally below 100 Hz) and the frequencies at which radio-frequency signals are received, typically between 10 kHz and 1 MHz, respectively.

Thanks to this construction, the coil 2 functions as a magnetic sensor and an electromagnetic antenna simultaneously, without this involving any problem as to the operation of the circuit (such as problems of interference between these two functions, for example).

In the counting device of FIG. 1, the microcontroller 10 is also connected to a rewritable non-volatile memory 16 (for example an Electrically Erasable and Programmable Read-Only Memory (EEPROM)). This non-volatile memory 16 stores information relating to the number of resets that the counting device has undergone, for example, which, as explained hereinafter, constitutes a protective measure against any attempts at fraud as to the number of turns counted.

Here resetting the number of turns counted is conditional in order to prevent untimely resetting: the microcontroller 10 launches a procedure for authorized resetting of the number of turns counted when the following two conditions are combined:

1) presence of an electrical voltage of predetermined value (for example greater than 3 V) on a dedicated pin 18 of the microcontroller 10; and 2) reception of re-activation information by means of the coil 2 and via the HF filter 6 in the manner already referred to.

During this authorized resetting phase, the external device that sends the re-activation information can also transmit a predetermined number or code that will therefore be received by the microcontroller 10 (via the coil 2 and the HF filter 6) and then stored by the microcontroller 10 in the memory used to store the number of turns counted (here the random access memory formed by the internal registers already referred to).

The code could instead be written into the microcontroller when programming it, and then copied into the memory used to store the number of turns counted (random access memory) during the authorized resetting phase.

The microcontroller 10 could then verify the presence of this information to check that the content of the memory (which consists of the number of turns counted) has not been reset or corrupted (for example by a fraudster seeking to reset the number of turns counted). There can then be provision for the microcontroller 10 to trigger the sending of the information to be transmitted by the transmitter 12 only on condition that it verifies beforehand the presence of the code in the memory.

In practice, the presence of the code in the memory can be verified by transmitting the code from the external device at the same time as the re-activation information already referred to, for example; the microcontroller 10 can then compare the code received with the re-activation information to the code stored in memory during the authorized resetting phase and thus verify that the memory has not been corrupted.

One possible embodiment of the coil 2, the LF filter 4 and the HF filter 6 that have just been described with reference to FIG. 1 is described next with reference to FIG. 2.

As described hereinafter, the first portion of the electric circuit represented in FIG. 2 executes functions other than those just referred to, and in particular shaping of the measurement signals as shown in FIG. 1.

Figure 2:
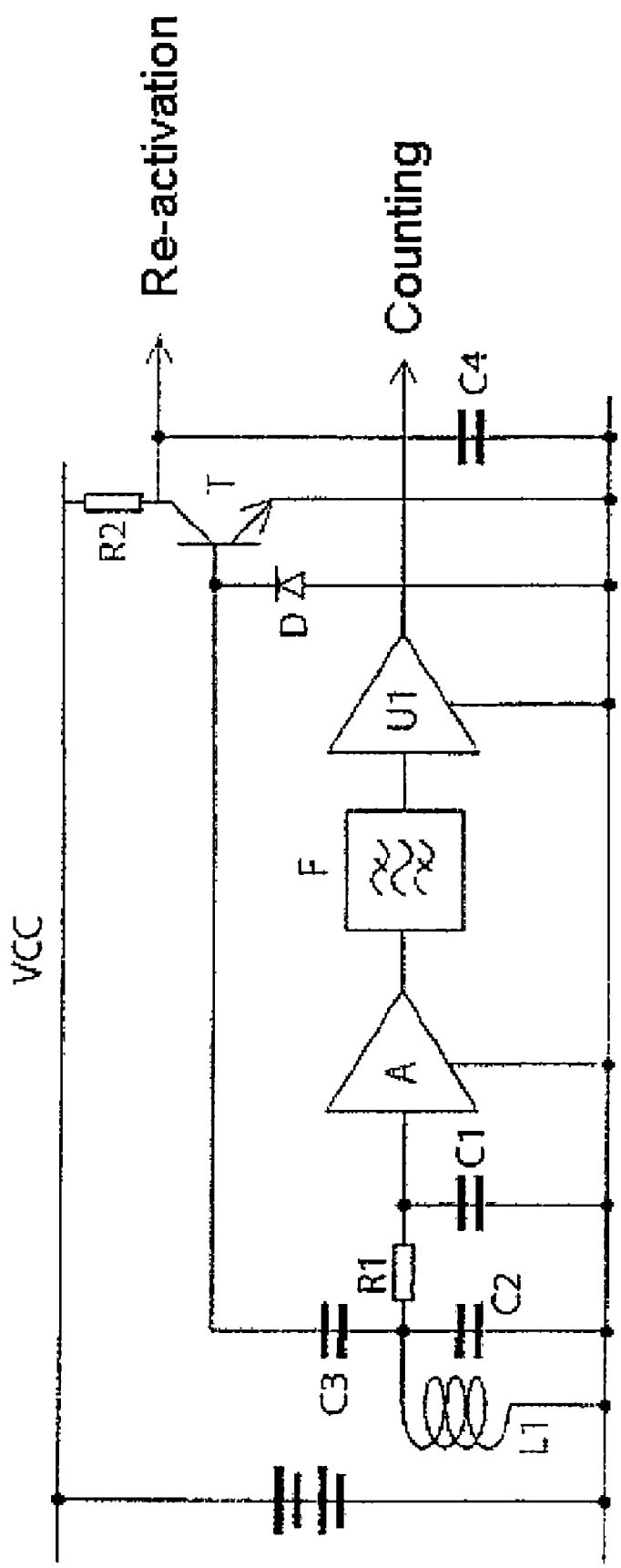
FIG. 2 illustrates a detailed example of a portion of the device of FIG. 1.

The coil 2 is represented in the electrical circuit diagram of FIG. 2 by an inductor L1.

The coil 2 is a winding of several thousand turns (for example from 1000 to 10 000 turns, here 3000 turns) each having an area of the order of 10 mm$^2$ and consisting of insulated copper wire, which gives it an inductance of a few tens of mH. An equivalent area of the order of a few dm$^2$, or even a few tens of dm$^2$ (for example from 1 dm$^2$ to 1 m$^2$) is obtained in this way.

The turns can advantageously be wound onto a core of high magnetic permeability, which improves sensitivity corresponding to a multiplication of the equivalent area, for example by a factor from 1 to 10, here a factor of 6.

These dimensions of the coil enable it at low frequencies to constitute a magnetic sensor with a sensitivity of the order of 1 V/Tesla at 1 Hz, which therefore generates at its terminals a voltage of the order of 50 μV at 1 Hz when it rotates in the terrestrial magnetic field (taking for the latter a characteristic value of 50 μT).

The dimensions of the coil 2 also enable it, by virtue of its stray capacitance $C_{stray}$, which has a value of approximately 40 pF, to constitute an electromagnetic antenna that is sensitive in particular around its resonant frequency $$f_0 = \frac{1}{2\pi}\sqrt{L1 \cdot C_{stray}},$$

which here is approximately 100 Hz.

As can be seen in FIG. 2, the terminals of the coil 2 (represented by the inductor L1) are on the one hand connected by the series combination of a resistor R1 and a capacitor C1 that form a low-pass filter F1 with a cut-off frequency of 9 Hz. This low-pass filter F1 enables transmission of only measurement signals to the later stages of the electronic circuit described hereinafter, even if other filters are provided to enhance this effect, also as explained hereinafter.

In the application considered here of measuring the number of rotations of the wheels of a heavy goods vehicle (the maximum speed whereof is of the order of 30 m/s and the circumference traveled by the sensor of the order of 3 m), the signals measured are below 10 Hz.

After filtering by the low-pass filter F1, the signals (at the terminals of the capacitor C1) are fed to a shaping stage comprising an amplifier A, a band-pass filter F and a comparator U1, for example. The amplifier can have a gain of 100, for example.

Figure 3:
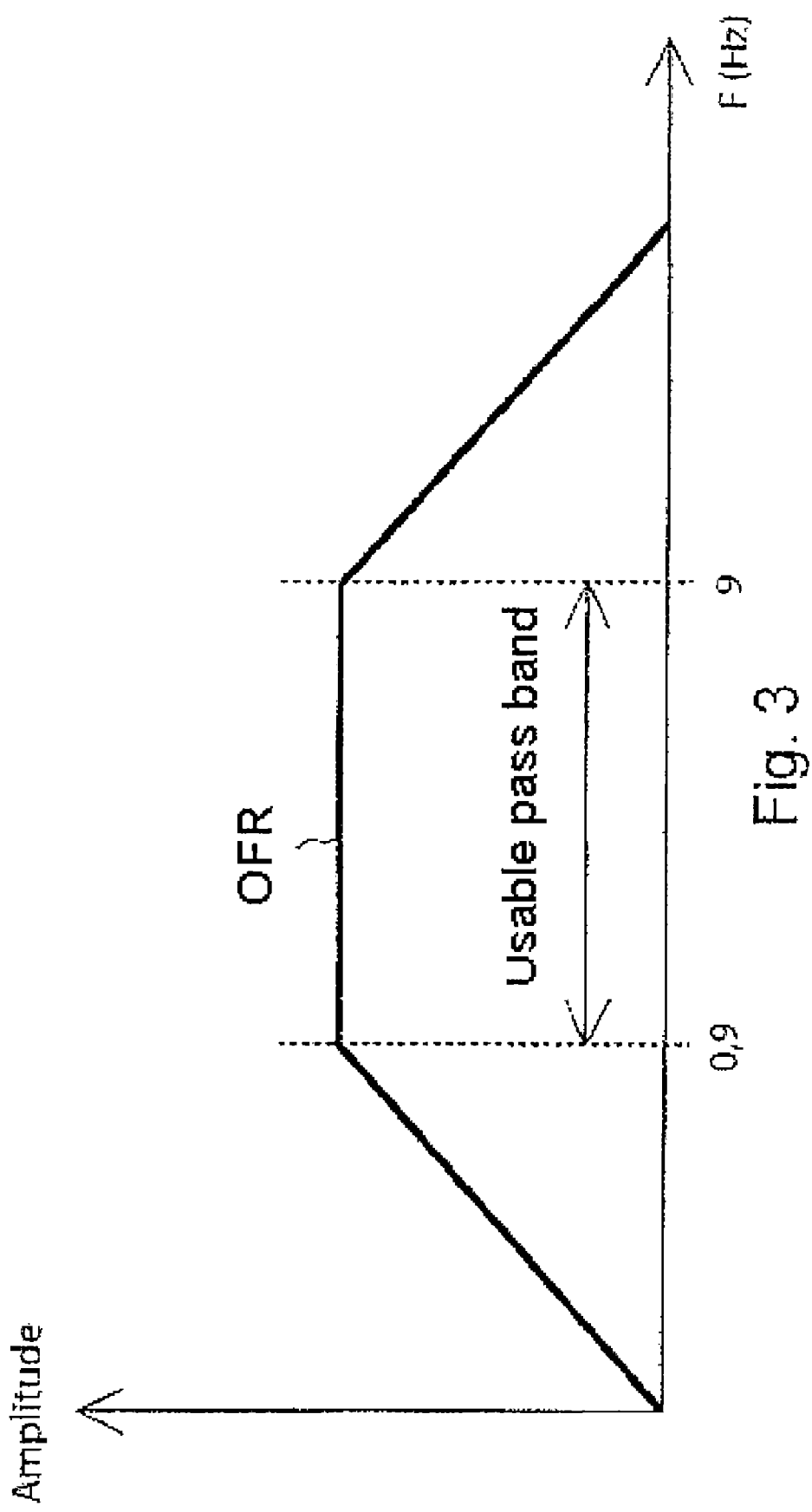
FIG. 3 illustrates the overall frequency response of a portion of the circuit illustrated in FIG. 2.

As can be seen clearly in FIG. 3, which represents the frequency response of the components that have just been described, the overall frequency response OFR of the combination of the inductor L1, the low-pass filter F1 and the shaping stage is for the most part situated between 0.9 Hz and 9 Hz, which constitutes the characteristic frequency range of the signals to be measured. (For a heavy goods vehicle, these frequencies correspond to speeds between approximately 10 kph and 100 kph).

Notice also that this overall frequency response OFR is essentially flat over this frequency range, which greatly simplifies subsequent processing of the output signals generated.

The signals amplified by the amplifier A and transmitted by the band-pass filter F are fed to the comparator U1, which executes a function of detecting cycles of the signal generated by the coil 2 because it is rotating in the terrestrial magnetic field, after processing as described above. This comparator U1 therefore generates counting pulses which are in corresponding relationship to the cycles of the signal generated by the coil 2 and are transmitted to the counter 8.

The circuit described above (and in particular the amplifier A) generates at the output of the band-pass filter F1 a signal for triggering the comparator; this then delivers a logic signal, for example with an amplitude of 3 V, compatible with digital circuits.

The terminals of the coil 2 (represented in the FIG. 2 circuit by the inductor L1) are secondly connected by means of a capacitor C2 (of 100 pF for example) which reduces the resonant frequency of the coil 2 (which has a natural resonant frequency of the order of 100 kHz as indicated above) to approximately 50 kHz. Using the capacitor C2 also stabilizes the resonant frequency of the combination to this value of 50 kHz, the stray capacitance of the coil 2 (approximately 40 pF as indicated above) being in practice unable to produce a sufficiently stable value of the resonant frequency.

The signal at the terminals of the combination of the inductor L1 and the capacitor C2 is transmitted to a transistor T via a capacitor C3 that allows to pass in the direction of the transistor T only signals at frequencies higher than a particular value. The capacitor C3 therefore forms a high-pass filter that has a cut-off frequency below 50 kHz here and constitutes the HF filter from FIG. 1.

Thus if the peak amplitude of the high-frequency signals (here at 50 kHz) at the terminals of the coil exceeds 0.6 V (thanks to the inherent amplification effect of the resonance of the combination at that frequency), the transistor T begins to conduct and its emitter-collector voltage falls from 3 V to 0 V, which constitutes a re-activation indication transmitted to the microcontroller 10.

The counting device is supplied with electrical power by a battery, for example a BR1632A battery delivering a voltage VCC of 3 V.

Various phases of operation of the counting device referred to above that can be envisaged and during which it dialogs with an external device as already indicated are described next with reference to FIG. 4.

Figure 4:
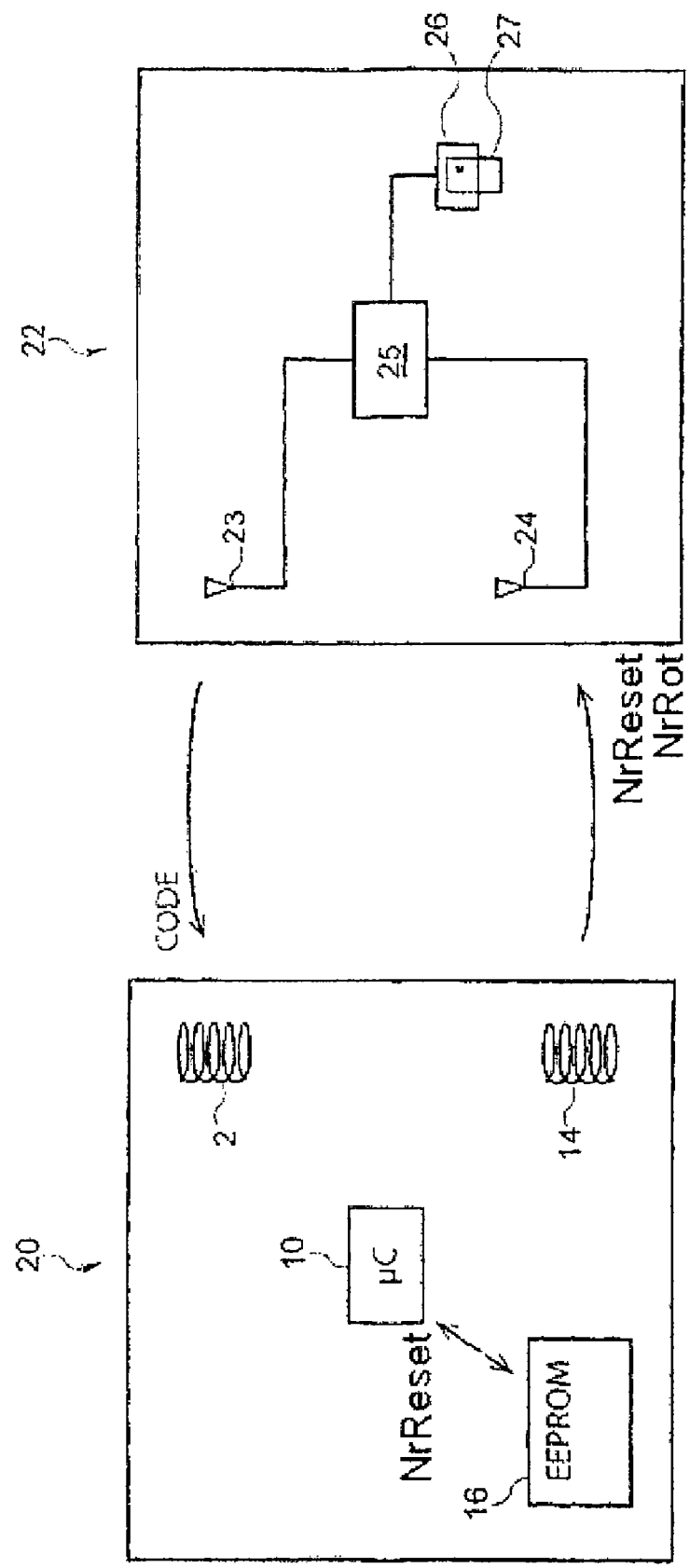
FIG. 4 illustrates the counting device of FIG. 1 and a surveillance device configured to communicate with the counting device.

The device for counting the number of rotations is represented generally in FIG. 4 under the reference 20. Certain of the components that constitute it (namely the coil 2, the microcontroller 10, the send antenna 14 and the non-volatile memory 16) are also represented diagrammatically in FIG. 4 in order to simplify that figure. The previous figures (in particular FIG. 1) can naturally be referred to for a detailed description of the composition of the counting device 20.

As already mentioned, the counting device 20 can dialog with an external device 22 (here a device for surveillance of the state of wear of the tires, which can in practice take the form of a dedicated terminal or station, or a device on board a vehicle).

The external device 22 comprises means 23 (typically an antenna) for sending an electromagnetic signal to the counting device 20 (more precisely the coil 2 in that device). The external device 22 also includes means 24 (of antenna type) for receiving the data transmitted by the counting device 20 by means of its transmit antenna 14.

The external device 22 operates under the general control of a microprocessor 25, for example. In one embodiment used as explained hereinafter, the external device 22 can further include a microcircuit card reader 26 connected to the microprocessor 25 and adapted to read data stored on a microcircuit card 27.

Various possible phases of the operation of the counting device 20 are described next.

Immediately after its production, and before any dialog with an external device 22, the counting device 20 is initialized as follows, for example: number NrReset of resets in the life of the device (stored in non-volatile memory 16):0; number NrRot of rotations counted resets (stored in the registers of the microcontroller):0.

The counting device can then be subject to displacements and movements, for example during its transportation prior to use, which may lead to risks of counting (and thus of incrementing) the number NrRot of rotations counted resets with no correspondence with actual wear of the system under surveillance.

It is therefore desirable to reset the count before the first real use of the equipment under surveillance, using an authorized resetting procedure.

This authorized resetting procedure is a conditional procedure, for example, that is executed when two conditions are satisfied, as already described, namely the presence of a predetermined voltage at a terminal 18 of the microcontroller 10 of the counting device 20 and reception of re-activation information generated by the external device 22.

During this kind of authorized resetting procedure (carried out by an authorized person who knows the procedure to be applied and holds a dedicated microcircuit card 27, for example), the external device 22 sends not only the re-activation information (which under the aforementioned conditions triggers the authorized resetting of the counting device 20), but also a number CODE read on the microcircuit card 27 by means of the card reader 26, for example, and thus transmitted on the instructions of the microprocessor 25 via the sending means 23. On reception of this number CODE during the authorized resetting phase, the microcontroller 10 of the counting device 20 stores this number CODE in its internal registers (or random access memory).

The microcontroller 10 then increments the value of the number NrReset of resets stored in non-volatile memory 16.

The counting device 20 can then start its normal operation, namely and primarily counting the number of rotations and storing the information NrRot representing that number.

In a subsequent phase of operation, the external device 22 can (generally at the request of an operator) require to find out the number counted in the counting device 20 in the manner already explained with reference to FIG. 1.

To this end, the sending means 23 of the external device 22 send a re-activation indication and the number CODE already sent when resetting the counting device 20 (in particular, in practice the number stored in the microcircuit card associated with the counting device 20).

On reception of the re-activation indication, the microcontroller 10 first verifies that the number it has just received in association with the re-activation indication is identical to the number stored during the authorized resetting phase, in order to detect any loss of data in its internal registers.

In the event of a difference between the number received and the number stored, the internal registers are considered to have been corrupted (whether by a fraudster or fortuitously); the information relating to the number of rotations counted is therefore suspect and will not be sent: in this case the transmitter 12 is not activated.

On the other hand, if the number received with the re-activation indication corresponds precisely to the number stored during the authorized resetting, the information indicating the number NrRot of rotations and the number NrReset of resets undergone by the counting device is sent to the external device 22 by means of the transmitter 12 and its antenna 14.

The external device 22 can then verify that the counting device has undergone one and only one reset, which makes the information indicating the number of rotations that has also been received reliable.

Alternatively, the fact that one and only one reset of the counting device 20 has been effected can be verified in the counting device itself; sending the information indicating the number of rotations can then also be prevented here if the result of such verification is negative.

The embodiment that has just been described, and in particular the numerical values given, constitutes only one possible embodiment of the invention.

The invention claimed is:

1. An electronic device for counting the number of rotations of an object in a frame of reference including a magnetic field, the electronic device rotating with the object and including a coil configured to act as a magnetic sensor, the device further comprising:
   storage means for holding counting information intended to represent the number of rotations counted at any time; and
   means for conditional resetting of the storage means adapted to reset the storage means if and only if at least two separate conditions are simultaneously satisfied, wherein at least one of the conditions comprises the reception of information contained in an electromagnetic signal emitted from an external device, and a second condition comprises application of a voltage,
   wherein the coil is configured to send measurement information to a microcontroller in a first frequency band and configured to act as an electromagnetic antenna receiving information in a second frequency band.

2. The device according to claim 1, further comprising means for receiving a request to send data, wherein a first of the at least two separate conditions comprises the reception of the request.

3. The device according to claim 2, wherein the storage means comprises a microcircuit, and wherein the second of the at least two separate conditions comprises the application of a predetermined voltage to a pin of the microcircuit.

4. The device according to claim 1 further comprising means for counting a number of resets of the storage means.

5. The device according to claim 4, wherein the means for counting are configured to store the number of resets in a non-volatile memory.

6. The device according to claim 4, further comprising means for sending data configured to send information relating to the number of resets.

7. The device according to claim 1 further comprising means for initializing the device, wherein the means are configured to reset the storage means at a predetermined time.

8. The device according to claim 7, wherein the initialization means are configured to store a predetermined code in a first portion of a random access memory.

9. The device according to claim 8, wherein the storage means comprises a second portion of the random access memory.

10. The device according to claim 9, further comprising means for verifying the presence of the predetermined code in the first portion of the random access memory.

11. The device according to claim 10 further comprising means for sending counting information adapted to send counting information only in the event of a positive verification by the means for verifying.

12. The device according to claim 10 further comprising means for receiving the predetermined code from an external device.

* * * * *